Patented Sept. 8, 1953

2,651,606

UNITED STATES PATENT OFFICE 2,651,606

RESOLUTION OF MIXTURES COMPRISING N-METHYLANILINE AND N,N-DIMETHYL-ANILINE

Thomas J. Deahl, Orinda, and Fred H. Stross and Marion D. Taylor, Berkeley, Calif., assignors to Shell Development Company, Emeryville, Calif., a corporation of Delaware No Drawing. Application October 29, 1951, Serial No. 253,752

6 Claims. (Cl. 202—42)

This invention relates to the resolution of mixtures comprising N-methylaniline in admixture with N,N-dimethylaniline. The invention relates more particularly to the separation of N-methylaniline from mixtures comprising N-methylaniline in admixture with N,N-dimethylaniline.

N-methylaniline and N,N-dimethylaniline are often encountered in admixture with one another. Available methods for their production generally result in the obtaining of a product comprising mixtures of both of these cyclic amines in relative proportions which will vary considerably with the nature of the particular process and operating conditions employed. In many processes to which such an amine must be charged in relatively pure state a residual product is frequently obtained comprising both amines in admixture with one another. Ability to employ efficiently N-methylaniline or N,N-dimethylaniline in many fields of application is often dependent upon its degree of purity. Heretofore, the obtaining of these amines in a relatively high state of purity has been exceedingly difficult because of the close proximity of their boiling temperatures rendering impractical the separation of one from admixture with the other by ordinary separating means such as, for example, simple or fractional distillation. The boiling temperatures of N-methylaniline and N,N-dimethylaniline at standard conditions are 195.7° C. and 193.5° C., respectively. Methods disclosed heretofore directed to their separation by such means as solvent extraction generally involve operational procedures of a complexity rendering impractical their use in large scale operation.

A method, such as, for example, that disclosed and claimed in co-pending application Serial Number 86,684, filed April 11, 1949, now Patent No. 2,580,284, of which the present application is a continuation-in-part, enables the production of N-methylaniline under conditions reducing to a minimum the simultaneous production therewith of undesired N,N-dimethylaniline. The removal of substantially all of the N,N-dimethylaniline contaminant is, however, often highly desirable, even when present in relatively small amounts, not only to obtain a product of high purity but to provide substantial advantages in the method of producing the desired amine. Thus, the ability to effect the efficient separation of N,N-dimethylaniline contaminant from N-methylaniline with a minimum of operative steps permits of greater flexibility in permissible conditions of operation in producing the desired amine.

It is an object of the present invention to provide an improved process enabling the more efficient resolution of mixtures comprising N-methylaniline in admixture with N,N-dimethylaniline.

Another object of the present invention is the provision of an improved process enabling the more efficient separation of N,N-dimethylaniline from mixtures comprising N-methylaniline and N,N-dimethylaniline.

A specific object of the invention is the provision of an improved process for the purification of impure N-methylaniline containing N,N-dimethylaniline in a contaminating amount enabling the more efficient separation of substantially all of said contaminating N,N-dimethylaniline from said impure N-methylaniline. Other objects and advantages of the invention will become apparent from the following detailed description thereof.

In accordance with the invention N,N-dimethylaniline is separated from a mixture containing N,N-dimethylaniline in admixture with N-methylaniline by distilling said mixture in the presence of aniline.

Aniline has a boiling temperature of 184.4° C. at atmospheric pressure, which is considerably below that of either N-methylaniline or N,N-dimethylaniline. The ratios of the vapor pressure of aniline and N-methylaniline at temperatures in the range, for example, of about 80° C. to about 150° C. vary from about 1.38 to about 1.42. The alpha value is nearly constant at about 1.4 in the range of temperatures corresponding to vapor pressure of from about 50 mm. to about 285 mm. (i. e., about 100 to 150° C.). Aniline is therefore readily separable from N-methylaniline by practical scale distillation means. Distillation of a mixture consisting essentially of N-methylaniline and aniline, containing 65.0% aniline, at an absolute pressure of 150 mm. and Hg in a column having the equivalent of 25 theoretical plates resulted in the separate recovery of aniline and N-methylaniline, each having a purity of 97 to 100%.

It would be expected that subjection to sharp fractionation of a ternary mixture containing N,N-dimethylaniline in addition to N-methylaniline and the relatively low boiling aniline would result in the obtaining of a lower boiling overhead containing aniline of relatively high purity, and that this would then be followed by the passage overhead of a higher boiling fraction containing considerable amounts of the relatively close boiling N-methylaniline and dimethylaniline. However, it has been found that the distillation of a mixture consisting essentially of N-methylaniline, aniline, and N,N-dimethylaniline results in the obtaining of an overhead at a constant temperature of a lower boiling mixture containing not only all of the aniline, but all of the N,N-dimethylaniline and only a minor amount of N-methylaniline, leaving as a distillation residue the N-methylaniline in a high state of purity free of any substantial amount of aniline and/or N,N-dimethylaniline.

Further investigation resulted in the discovery that aniline and N-methylaniline form an azeotropic mixture containing about 85 to 90% by weight of aniline and about 15 to 10% by weight of N,N-dimethylaniline having a boiling temperature at atmospheric pressure of about 184° C. and 115–119° C. at 90 to 100 mm. Hg absolute. In the distillation of a mixture containing 81% aniline and 19% N,N-dimethylaniline in a column of 2.0 cm. diameter having a height of 140 cm. packed with $\tfrac{3}{16}$ inch glass helices and operated with 20 moles of reflux per mole of distillate at 85 to 100 mm. Hg pressure the composition of the overhead remained substantially constant at 83% aniline and 17% N,N-dimethylaniline until 75% of the charge had been distilled over.

The existence of the azeotrope thus brings within the realm of practicability the obtaining of N-methylaniline of high purity from mixtures of N-methylaniline and N,N-dimethylaniline by adding the proper amount of aniline and subjecting the resulting mixture to azeotropic distillation as exemplified by the following example:

To a mixture of N-methylaniline and N,N-dimethylaniline there was added aniline to result in a ternary mixture having the following composition:

| | Per cent by weight |
|---|---|
| Aniline | 37.3 |
| N-methylaniline | 58.7 |
| N,N-dimethylaniline | 4.7 |

The ternary mixture was distilled in a glass column having a diameter of 2.0 cm. and a height of 140 cm. under the following conditions:

Column packing.. $\tfrac{3}{16}$ inch glass helices.
Pressure.......... 85 to 100 mm. Hg.
Reflux ratio...... 20 moles of distillate per mole of distillate.

Under the above conditions the overhead from the distillation had the following composition:

| | Per cent by weight |
|---|---|
| Aniline | 87 |
| N-methylaniline | 7 |
| N,N-dimethylaniline | 6 | and contained all of the aniline and all of the N,N-dimethylaniline charged to the distillation. The distillation residue consisted essentially of N-methylaniline having the following composition:

| | |
|---|---|
| Aniline | Indeterminable. |
| N-methylaniline | 99.7%. |
| N,N-dimethylaniline | <0.2. |
| Loss | Approx. 0.1. |

The amount of aniline added to the mixture of N-methylaniline and N,N-dimethylaniline to be separated by azeotropic distillation may vary considerably within the scope of the invention. The amount of aniline employed will depend primarily upon the extent of N,N-dimethylaniline removal which it is desired to attain under the specific conditions employed. In effecting the removal of substantially all of the N,N-dimethylaniline from admixture with the N-methylaniline it is preferred to add aniline to the mixture to be distilled in an amount equal to at least 5.5 times, and preferably 9 times, the weight of the N,N-dimethylaniline in the mixture. Since aniline is removed readily from N-methylaniline by ordinary distillation means, the use of an excess of aniline, for example, an amount of aniline equal to at least 10 times the weight of the N,N-dimethylaniline in the mixture, is preferably employed when it is intended to attain substantially complete removal of all N,N-dimethylaniline from the mixture during the course of the azeotropic distillation. An amount of aniline exceeding that required to effect removal by azeotropic distillation of the dimethylaniline from admixture with N-methylaniline may be resorted to within the scope of the invention. If only partial removal of the dimethylaniline is desired, then aniline in an amount less than 5.5 times the weight of the dimethylaniline in the N-methylaniline-N,N-dimethylaniline mixture may be resorted to within the scope of the invention. In general, in azeotropic distillations in varying types of operations directed to the separation of N,N-dimethylaniline from N-methylaniline, the use of aniline as azeotroping agent in an amount ranging from about 5 to 25 times the weight of the N,N-dimethylaniline in the mixture has been found satisfactory.

The process of the invention thus provides a highly efficient and remarkably simple procedure enabling substantially complete separation of N,N-dimethylaniline from mixtures containing it in admixture with N-methylaniline. In the separation of N,N-dimethylaniline from admixture with N-methylaniline in accordance with the invention, and in recovery of aniline from the resulting aniline-N,N-dimethylaniline distillate, advantage may be taken of the further discovery that the difference between the boiling temperature of aniline and that of the N,N-dimethylaniline-aniline azeotrope increases somewhat as the pressure is reduced. Thus, whereas the azeotrope boils at a temperature about 0.5° C. lower than aniline at atmospheric pressure, at a reduced pressure, for example, of about 90 to 100 mm. Hg absolute, it boils at a temperature about 1.5 to 2.5° C. lower than aniline at a corresponding pressure. Aniline may be removed from the N,N-dimethylaniline-aniline containing azeotrope taken overhead during the distillation and returned to the azeotropic distillation. Suitable means resorted to effect the recovery of aniline from the aniline-N,N-dimethylaniline overhead may comprise one or more such steps, as, for example, azeotropic distillation, solvent extraction, and the like. In processes wherein methylanilines are produced such as, for example, in a process of the type disclosed and claimed in copending application Serial Number 86,684 a mixture consisting essentially of aniline and N,N-dimethylaniline resulting from the azeotropic distillation of a product stream may be sent directly to the reaction zone. The azeotropic mixture may be subjected to any suitable reaction conditions wherein interaction of aniline and N,N-dimethylaniline compounds takes place, preferably with the formation of reaction products comprising N-methylaniline.

The invention claimed is:

1. The process for separating N,N-dimethylaniline from mixtures containing N-methylaniline in admixture with N,N-dimethylaniline which comprises adding aniline to said mixture and distilling an azeotrope consisting essentially of aniline and N,N-dimethylaniline at a subatmospheric pressure from said mixture.

2. The process for separating N,N-dimethylaniline from a mixture containing N,N-dimethylaniline in admixture with N-methylaniline which comprises adding aniline to said mixture and distilling an azeotropic mixture consisting essentially of aniline and N,N-dimethylaniline from said mixture.

3. The process for separating N,N-dimethylaniline from a mixture containing N,N-dimethylaniline in admixture with N-methylaniline which comprises adding an amount of aniline to said mixture equal to at least ten times the weight of N,N-dimethylaniline in said mixture and azeotropically distilling a mixture consisting essentially of aniline and N,N-dimethylaniline from said mixture.

4. The process for the removal of N,N-dimethylaniline from a mixture containing N-methylaniline in admixture with N,N-dimethylaniline which comprises adding to said mixture an amount of aniline equal to from about 5 to about 25 times the weight of the N,N-dimethylaniline present in said mixture and distilling an azeotropic mixture consisting essentially of aniline and N,N-dimethylaniline at a pressure below atmospheric from said mixture.

5. The process for the purification of N-methylaniline containing N,N-dimethylaniline in contaminating amounts which comprises adding to said mixture an amount of aniline equal to at least five times the weight of N,N-dimethylaniline in said mixture and azeotropically distilling a mixture consisting essentially of aniline and N,N-dimethylaniline from said mixture.

6. The process for separating N,N-dimethylaniline from a mixture consisting essentially of N,N-dimethylaniline and N-methylaniline which comprises adding to said mixture an amount of aniline equal to from about 5 to about 25 times the weight of N,N-dimethylaniline in said mixture and azeotropically distilling a mixture consisting essentially of aniline and N,N-dimethylaniline from said mixture.

THOMAS J. DEAHL.
FRED H. STROSS.
MARION D. TAYLOR.

References Cited in the file of this patent

UNITED STATES PATENTS

| Number | Name | Date |
|---|---|---|
| 1,794,057 | Britton et al. | Feb. 24, 1931 |
| 2,126,600 | Andrews et al. | Aug. 8, 1938 |

FOREIGN PATENTS

| Number | Country | Date |
|---|---|---|
| 102,834 | Great Britain | Jan. 4, 1917 |
| 553,448 | Great Britain | May 21, 1943 |